(12) United States Patent
Banik

(10) Patent No.: US 9,417,350 B2
(45) Date of Patent: Aug. 16, 2016

(54) SUBSALT VELOCITY MODEL BUILDING

(75) Inventor: Niranjan C. Banik, Richmond, TX (US)

(73) Assignee: WESTERNGECO, L.L.C., Houston, TX (US)

( * ) Notice: Subject to any disclaimer, the term of this patent is extended or adjusted under 35 U.S.C. 154(b) by 991 days.

(21) Appl. No.: 12/535,386

(22) Filed: Aug. 4, 2009

(65) Prior Publication Data

US 2009/0290451 A1  Nov. 26, 2009

Related U.S. Application Data

(63) Continuation of application No. 11/751,095, filed on May 21, 2007, now Pat. No. 7,586,811.

(60) Provisional application No. 60/810,320, filed on Jun. 2, 2006.

(51) Int. Cl.
*G01V 1/00* (2006.01)
*G01V 1/30* (2006.01)

(52) U.S. Cl.
CPC ...................................... *G01V 1/303* (2013.01)

(58) Field of Classification Search
CPC .................................................... G01V 1/303
USPC .............................. 367/38, 50–53, 73; 702/16
See application file for complete search history.

(56) References Cited

U.S. PATENT DOCUMENTS

| | | | |
|---|---|---|---|
| 4,992,996 A | 2/1991 | Wang et al. | |
| 5,300,929 A | 4/1994 | MacLeod | |
| 5,307,268 A | 4/1994 | Wang et al. | |
| 5,570,321 A * | 10/1996 | Bernitsas | 367/38 |
| 5,642,328 A * | 6/1997 | Houck et al. | 367/53 |
| 6,018,499 A * | 1/2000 | Sethian et al. | 367/72 |
| 6,253,157 B1 | 6/2001 | Krebs | |
| 6,574,564 B2 | 6/2003 | Lailly et al. | |
| 6,687,618 B2 * | 2/2004 | Bevc et al. | 702/14 |
| 6,989,841 B2 | 1/2006 | Docherty | |
| 7,065,004 B2 | 6/2006 | Jiao et al. | |
| 7,095,678 B2 * | 8/2006 | Winbow et al. | 367/73 |
| 7,400,553 B1 * | 7/2008 | Jin et al. | 367/53 |
| 7,493,241 B2 * | 2/2009 | Lee | 703/2 |
| 7,505,360 B2 * | 3/2009 | Bisley et al. | 367/24 |
| 7,586,811 B2 | 9/2009 | Banik | |
| 7,609,585 B2 * | 10/2009 | Jiao et al. | 367/50 |
| 2005/0143921 A1 | 6/2005 | Winbow et al. | |
| 2007/0258324 A1 * | 11/2007 | Zhao et al. | 367/52 |

(Continued)

FOREIGN PATENT DOCUMENTS

GB  2438306 A  11/2007

OTHER PUBLICATIONS

Young, et al. Subsalt imaging in Walker Ridge, Gulf of Mexico. Veritas GDC 2005.*

(Continued)

*Primary Examiner* — Krystine Breier
(74) *Attorney, Agent, or Firm* — Abimbola Bukoye

(57) ABSTRACT

Method for building a subsalt velocity model. In one implementation, the method may include determining a velocity of a sedimentary area surrounding a salt body, determining an initial velocity of a subsalt sedimentary area disposed below the salt body by interpolating the velocity of the surrounding sedimentary area with one or more boundaries defining the salt body, and updating the initial velocity of the subsalt sedimentary area.

20 Claims, 3 Drawing Sheets

(56) References Cited

U.S. PATENT DOCUMENTS

2007/0259432 A1* 11/2007 Zhao et al. .................... 436/25
2008/0228402 A1 9/2008 Ferber

OTHER PUBLICATIONS

Lafond, et al. Imaging deepwater salt bodies in West Africa. The Leading Edge, Sep. 2003.*
Liro, et al. Application of 3-D visualization to integrated geophysical and geologic model building, subsalt depth migration project, deepwater Gulf of Mexico.*
Pan, et al. Depth imaging and regoinal exploration in Northeast Garden Banks, Gulf of Mexico. The Leading Edge, Apr. 2006.*
Rhodes, at al. A practical and integrated depth migration approach to prospect identification in BM-ES-11. 2005, SBGf.*
Young, "Subsalt Imaging in Walker Ridge, Gulf of Mexico", Veritas DGC, 2005.*
Young, "Subsalt Imaging in Walker Ridge, Gulf of Mexico", Veritas DGC 2005.*
Search Report of British Application No. 0710294.0 dated Oct. 17, 2007: pp. 1-3.
Examination Report of British Application No. 0710294.0 dated Jun. 14, 2010: pp. 1-3.
Bloor, "Building velocity models using tomography," SEG Expanded Abstracts, 1998: pp. 1-4.
"Gulf of Mexico Continental Slope—Understanding the Magnetic Response Due to the Salt Intrusion," Integrated Geophysics Corporation, Footnotes on Interpretation, Oct. 1993, vol. 1(1): pp. 1-4, <http://www.igcworld.com/PDF/oct93.pdf>.
Purnell et al., "SP 2.4: Fast track 3D pre-stack depth migration of the Neptune structure, Offshore Gulf of Mexico," Society of Exploration Geophysics, SEG International Exposition and Sixty-Seventh Annual Meeting, Expanded Abstracts with Biographies 1997 Technical Program vol. II, Nov. 1997: pp. 1078-1081.
Albertin, et al., "Depth imaging examples and methodology in the Gulf of Mexico", May 2001, The Leading Edge, pp. 498-513.
Bloor, et al., "SPRO 7.4: Tomographic velocity model updating for prestack depth migration", Oct.-Nov. 1999, Society of Exploration Geophysics, SEG International Exposition and Sixty-Ninth Annual Meeting, Expanded Abstracts with Biographies 1999 Technical Program vol. II, pp. 1247-1250.
Tiemann, "Investigating the velocity-depth ambiguity of reflection traveltimes", Nov. 1994, Geophysics, vol. 59 (11), pp. 1763-1773.
Woodward, et al., "SP 5.6: Automated 3D tomographic velocity analysis of residual moveout in prestack depth migrated common image point gathers", Sep. 1998, Society of Exploration Geophysics, SEG International Exposition and Sixty-Eighth Annual Meeting, Expanded Abstracts with Biographies 1998 Technical Program vol. II, pp. 1218-1221.

* cited by examiner

SUBSALT VELOCITY MODEL BUILDING

CROSS-REFERENCE TO RELATED APPLICATIONS

This application is a continuation of U.S. patent application Ser. No. 11/751,095, filed May 21, 2007, now U.S. Pat. No. 7,586,811 which claims benefit of U.S. provisional patent application Ser. No. 60/810,320, filed Jun. 2, 2006. Each of the aforementioned related patent applications is herein incorporated by reference.

BACKGROUND

1. Field of the Invention

Implementations of various technologies described herein generally relate to the field of seismic data processing, and more specifically, to prestack depth migration.

2. Description of the Related Art

The following descriptions and examples are not admitted to be prior art by virtue of their inclusion within this section.

Seismic surveying may be used to determine structures or compositions of subsurface earth formations. For example, seismic surveying may be used to determine the presence of useful materials, such as petroleum, in the subsurface earth formations. Generally, the process of seismic surveying includes deploying an array of seismic sensors at or near the earth's surface at selected geographic positions and deploying one or more seismic energy sources at selected locations, also at or near the earth's surface. The one or more seismic energy sources may be actuated, causing seismic energy to emanate from the sources, traveling generally downwardly through the earth's subsurface until it reaches one or more acoustic impedance boundaries in the earth. The seismic energy may be reflected from the one or more impedance boundaries, where it may then travel upwardly until detected by one or more of the seismic sensors. Structures and compositions of the earth's subsurface may be inferred from the travel time of the reflected seismic energy, from the geographic position of the source to each of the sensors, and from the amplitude and phase of the various frequency components of the reflected seismic energy with respect to the energy emanating from the seismic source.

Structures of the earth's subsurface may be inferred from the travel time of the seismic energy from the source to the acoustic impedance boundaries and back to the seismic sensors at the surface. In order to infer depth of and the structures of subsurface earth formations from reflection seismic travel times measured at the earth's surface, it may be necessary to determine the acoustic velocity of the various formations through which the seismic energy passes. Velocities of the earth formations may vary both with respect to depth in the earth (vertically), and with respect to geographic position (laterally). Seismic data, however, are typically recorded only with respect to time. Methods known in the art for estimating velocities of the earth formations both vertically and laterally rely on inferences about the travel path geometry of the seismic energy as it travels from the seismic source to the various seismic receivers deployed at or near the earth's surface.

SUMMARY

Described herein are various techniques for a method for building a subsalt velocity model. In one implementation, the method may include determining a velocity of a sedimentary area surrounding a salt body, determining an initial velocity of a subsalt sedimentary area disposed below the salt body by interpolating the velocity of the surrounding sedimentary area with one or more boundaries defining the salt body, and updating the initial velocity of the subsalt sedimentary area.

In another implementation, the boundaries of the salt body may be defined by: selecting a top horizon of the salt body, performing a salt-flood migration on a subsurface velocity model containing the salt body, the sedimentary area and the subsalt sedimentary area; selecting a base horizon of the salt body; and defining the boundaries of the salt body based on the top horizon and the base horizon.

In yet another implementation, the initial velocity of the subsalt sedimentary area may be updated by: determining a thickness of a subsalt layer disposed directly below the salt body, determining a velocity of the subsalt layer and applying a three dimensional smoothing filter to the velocity of the subsalt layer.

Described herein are also various technologies for subsurface velocity model having one or more velocity values in a salt body, one or more velocity values in a top salt sedimentary area disposed above the salt body, and one or more velocity values in a subsalt sedimentary area disposed below the salt body, wherein the one or more velocity values in the subsalt sedimentary area comprises one or more velocity values in a subsalt layer disposed directly below the salt body.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Since many prolific reservoirs have been discovered in sediments below salt bodies, exploration in sediments below the salt bodies have become of special importance to hydrocarbon exploration. However, due to the sharp velocity and acoustic impedance contrasts between the salt bodies and the sediments surrounding the salt bodies, updating of the subsalt velocity and thus imaging of the subsalt sediments have been difficult. Generally, the subsalt velocity may be updated using vertical scan, vertical update or tomographic update techniques. In velocity scan, multiple velocity models may be used to migrate target lines and the velocity that provides the most coherent image and the flattest image gathers may be selected as the final velocity model. In vertical update, the velocity correction may be obtained from residual velocity analysis to optimize the flatness of reflection events in gathers. In tomographic update, the events in migrated image gathers may be picked and the residual velocity may be estimated to flatten the gathers using an optimization process which involves ray-tracing with the existing model. However, any of these techniques often generates inaccurate results, particularly where the salt bodies have rugose structures. Accordingly, implementations of various techniques described herein are directed to enhance subsalt velocity updates by improving the signal to noise ratio in the post-migration subsalt seismic gathers.

One or more implementations of various techniques for building a subsalt velocity model will now be described in more detail with reference to FIGS. 1-3 in the following paragraphs.

Figure 1:
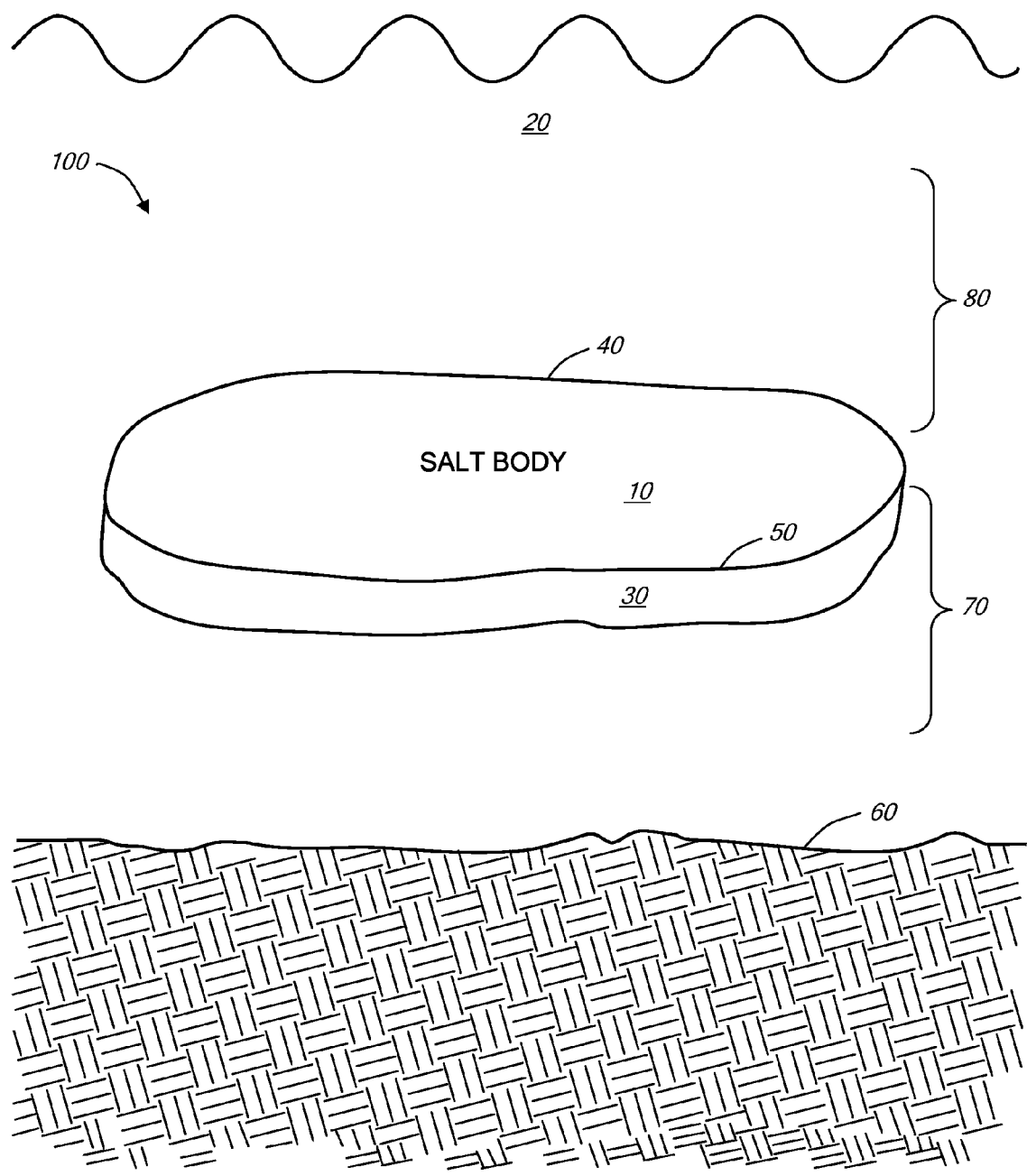
FIG. 1 illustrates a subsurface velocity model in accordance with implementations of various techniques described herein.

FIG. 1 illustrates a subsurface velocity model 100 in accordance with implementations of various techniques described herein. The subsurface velocity model 100 may include the velocity in a salt body 10 and the velocity in a sedimentary area 20 surrounding the salt body 10. The surrounding sedimentary area 20 may include a top salt sedimentary area 80 and subsalt sedimentary area 70. The top salt sedimentary area 80 is the sedimentary area directly above the salt body 10. The subsalt sedimentary area 70 is the area below the salt body 10. The sedimentary area 20 may include sand and shale. The subsurface velocity model 100 may further include a velocity in a subsalt layer 30 disposed directly below the salt body 10. The creation of the subsalt layer 30 will be described in more detail with reference to FIG. 2. The subsalt layer 30 may be part of the subsalt sedimentary area 70.

Figure 2:
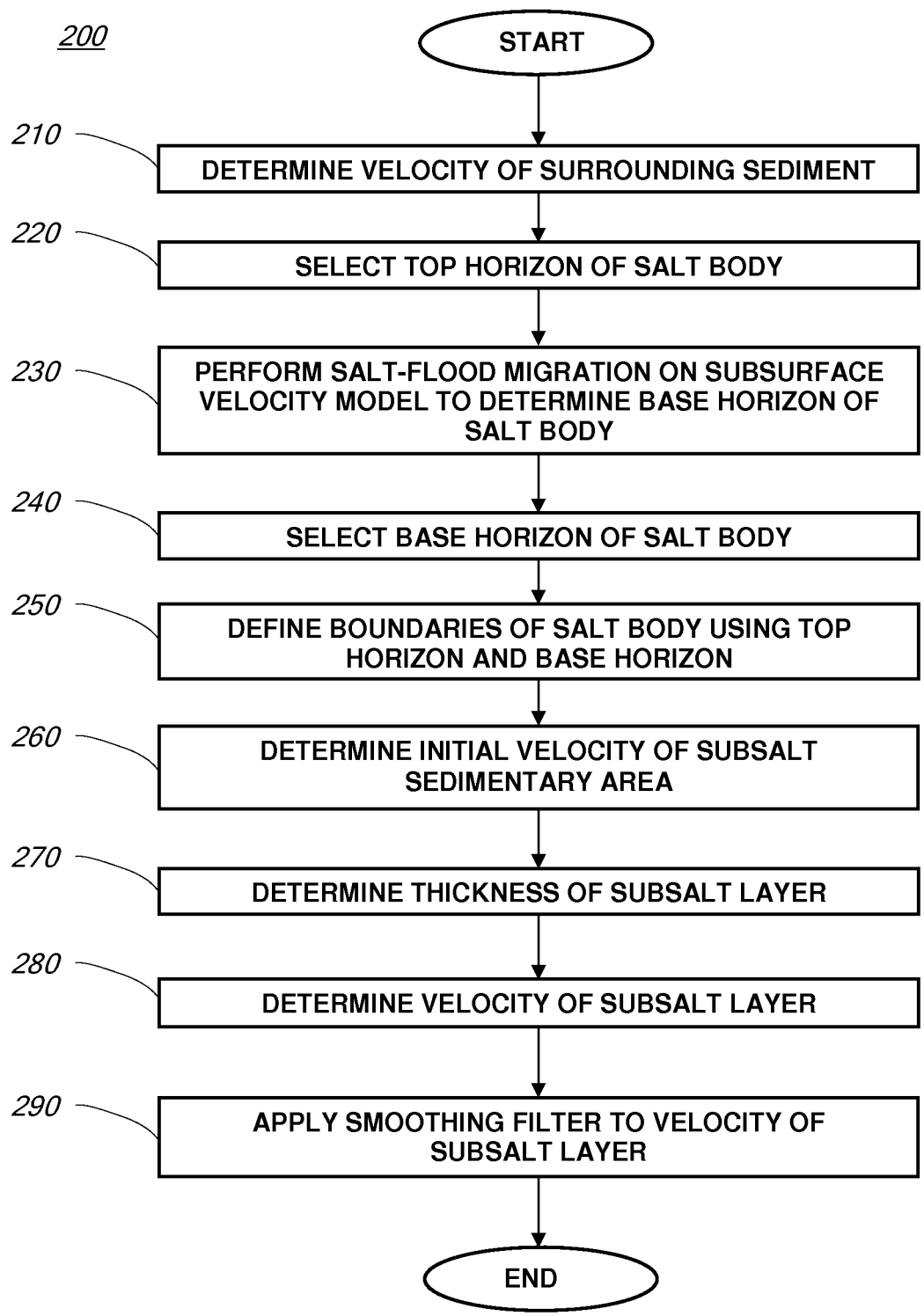
FIG. 2 illustrates a flow diagram of a prestack depth migration method in accordance with implementations of various technologies described herein.

FIG. 2 illustrates a flow diagram of a prestack depth migration method 200 in accordance with implementations of various technologies described herein. It should be understood that while the operational flow diagram 200 indicates a particular order of execution of the operations, in some implementations, certain portions of the operations might be executed in a different order.

At step 210, the velocity of the surrounding sedimentary area 20 may be determined. The velocity of the surrounding sedimentary area 20 may be determined by performing a number of migrations and velocity updates on the prestack seismic gathers. Migration may be defined as a sequence of signal processing steps that accurately images and positions subsurface geologic structures. In one implementation, an accurate subsurface velocity model is essential for migration, especially for prestack depth migration. Velocity update may be defined as a method to correct the velocity after a migration. The velocity updates may be performed using velocity scan, vertical update or tomography techniques. The migrations and velocity updates on the prestack seismic gathers may be repeated until the image of the surrounding sedimentary area 20 is coherent and has a predetermined sharpness and/or the events of the prestack seismic gathers for the surrounding sedimentary area 20 are substantially flat.

At step 220, the top horizon 40 of the salt body 10 may be selected.

At step 230, a salt-flood migration may be performed on the subsurface velocity model 100 to determine the base horizon 50 of the salt body 10. The salt-flood migration may involve extending the top horizon 40 of the salt body to the maximum depth 60 of the subsurface velocity model 100 and flooding the subsurface velocity model 100 with the velocity inside the salt body 10, i.e., salt velocity, which may be determined from lab data.

At step 240, the base horizon 50 of the salt body 10 may be selected.

At step 250, the top horizon 40 and the base horizon 50 may be used to define the boundaries of the salt body 10. In one implementation, in addition to the top horizon 40 and the base horizon 50, the salt body 10 may be defined by overhang horizons on the top horizon 40 or the base horizon 50 (not shown).

At step 260, the initial velocity of the subsalt sedimentary area 70 may be determined by interpolating the velocity of the surrounding sedimentary area 20, which was determined at step 210, with the boundaries defining the salt body 10 and other well information.

Steps 270-290 may be directed to updating the velocity of the subsalt sedimentary area 70. Initially, the velocity of the subsalt sedimentary area 70 at a given depth would be substantially the same as the surrounding sedimentary velocity. It may be assumed that the presence of the salt body 10 may cause a decrease in the velocity of the subsalt sedimentary area 70.

Steps 270-280 may be directed to determining the subsalt layer 30. Although the subsalt layer 30 may be described as a single subsalt sedimentary layer, it should be understood that in some implementations the subsalt layer 30 may include more than one subsalt sedimentary layer.

At step 270, the thickness of the subsalt layer 30 may be determined according to the following expression: $t=a*T$, where t is the thickness of the subsalt layer 30, a is a parameter and T is the thickness of the salt body 10. The thickness of the subsalt layer 30 may vary spatially, i.e., along the base horizon 50 of the salt body 10. Parameter a may be a constant or a mathematical function of the spatial location and shape of the salt body 10. In this manner, the thickness of the subsalt layer 30 may be proportional to the thickness of the salt body 10. In one implementation, parameter a may be selected based on data obtained from wells that penetrate salt bodies.

At step 280, the velocity of the subsalt layer 30 may be determined according to the following expression: $v=(Vtss+b*Vbss)/(1+b)$, where v is the velocity of the subsalt layer 30, Vtss is the velocity of the top salt sedimentary area 80, b is a parameter and Vbss is the initial velocity in the subsalt sedimentary area 70, which was determined at step 260. In this manner, the velocity of the subsalt layer 30 may be a simple weighted average of the velocity of the top salt sedimentary area 80 and the initial velocity of the subsalt sedimentary area 70. In one implementation, the velocity of the subsalt layer 30 may be assumed to be vertically constant along the base horizon 50. Like the thickness of the subsalt layer 30, the velocity of the subsalt layer 30 may also vary spatially, i.e., along the base horizon 50 of the salt body 10. Parameter b may be a constant or a mathematical function. In one implementation, parameter b may be selected based on data obtained from wells that penetrate salt bodies.

At step 290, a three dimensional smoothing filter may be applied to the velocity of the subsalt layer 30. In one implementation, the three dimensional smoothing filter may be applied without the base horizon 50 of the salt body 10. In such an implementation, the velocity of the subsalt layer 30 may be finalized with the base horizon 50 of the salt body 10. Such finalization may include various steps, such as tying the horizons in all directions to minimize the amount of gap between top salt and base salt horizons, applying another smoothing filter, gridding and the like.

Although various subsalt velocity model building implementations have been described with reference to prestack depth migration, it should be understood that these various subsalt velocity model building implementations may be used in prestack and poststack time migration, poststack depth migration, time-to-depth stretch, pore pressure prediction, stratigraphic imaging and interpretation, and the like.

Figure 3:
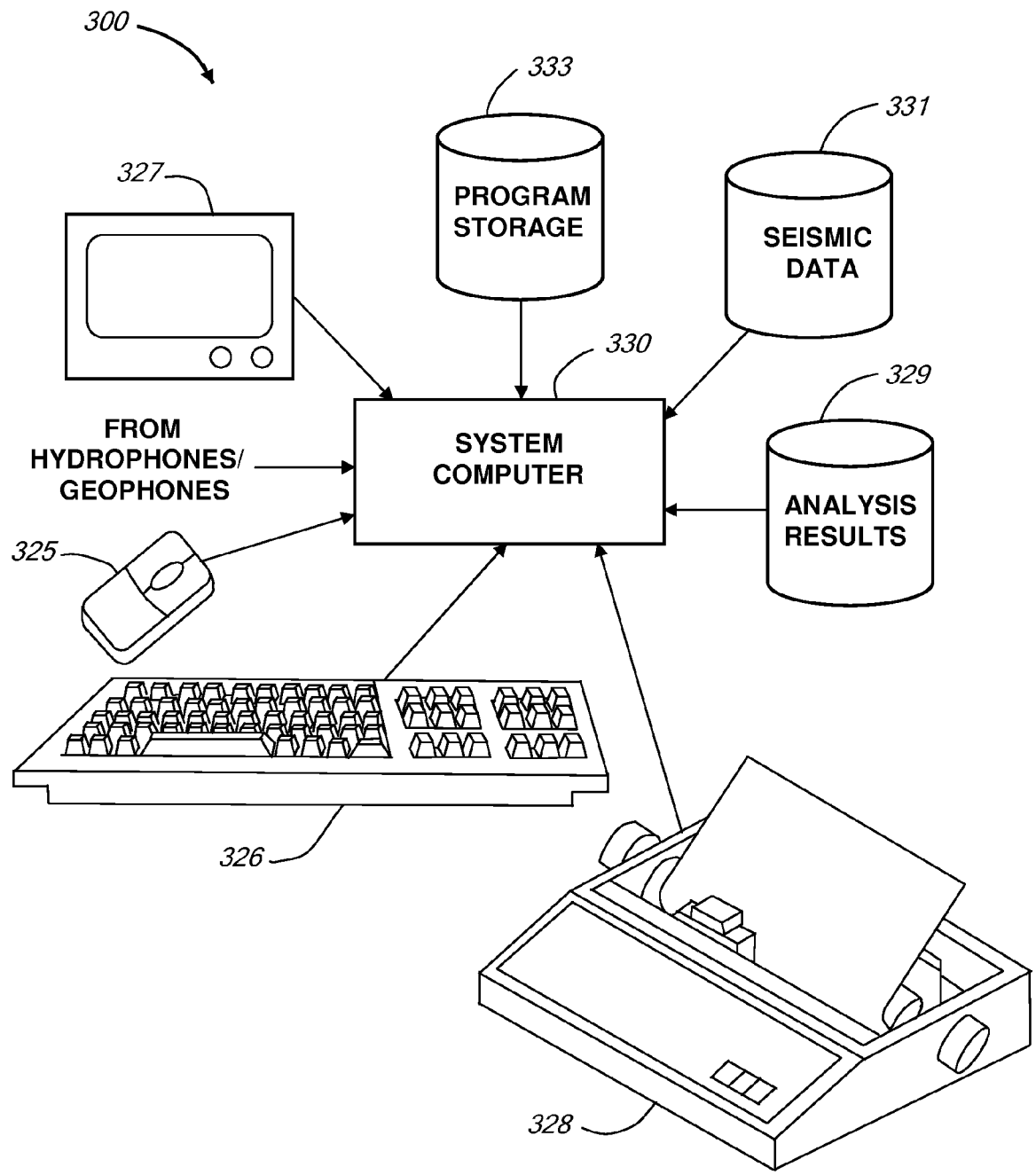
FIG. 3 illustrates a computer network, into which implementations of various technologies described herein may be implemented.

FIG. 3 illustrates a computing system 300, into which implementations of various technologies described herein may be implemented. The computing system 300 may include one or more system computers 330, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 330 may be in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one implementation, seismic data from the receivers may be stored in disk storage device 331. The system computer 330 may retrieve the appropriate data from the disk storage device 331 to process seismic data according to program instructions that correspond to implementations of various technologies described herein. The program instructions may be written in a computer programming language, such as C++, Java and the like. The program instructions may be stored in a computer-readable medium, such as program disk storage device 333. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 330. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 330 may present output primarily onto graphics display 327, or alternatively via printer 328. The system computer 330 may store the results of the methods described above on disk storage 329, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 may be in communication with the receivers (either directly or via a recording unit, not shown), to receive signals indicative of the reflected seismic energy. These signals, after conventional formatting and other initial processing, may be stored by the system computer 330 as digital data in the disk storage 331 for subsequent retrieval and processing in the manner described above. While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for building a subsalt velocity model, comprising:
    performing one or more migrations and one or more velocity updates on one or more prestack seismic gathers to determine a velocity of a sedimentary area surrounding a salt body, wherein the sedimentary area surrounding the salt body comprises a top salt sedimentary area and a subsalt sedimentary area;
    determining an initial velocity of the subsalt sedimentary area disposed below the salt body by interpolating the velocity of the surrounding sedimentary area with one or more boundaries defining the salt body; and
    updating, using a microprocessor, the initial velocity of the subsalt sedimentary area, wherein updating the initial velocity of the subsalt sedimentary area comprises:
        determining a thickness of a subsalt layer disposed directly below the salt body;
        determining a velocity of the subsalt layer; and
        applying a three dimensional smoothing filter to the velocity of the subsalt layer.

2. The method of claim 1, wherein the thickness of the subsalt layer is determined according to $t=a*T$, where t represents the thickness of the subsalt layer, a represents a parameter and T represents the thickness of the salt body.

3. The method of claim 2, wherein the parameter a is a constant value.

4. The method of claim 2, wherein the parameter a is a mathematical function of spatial location and shape of the salt body.

5. The method of claim 1, wherein the thickness of the subsalt layer spatially varies along a base horizon of the salt body.

6. The method of claim 1, wherein the velocity of the subsalt layer is determined according to $v=(V_{tss}+b*V_{bss})/(1+b)$, where v represents the velocity of the subsalt layer, $V_{tss}$ represents the velocity of a top salt sedimentary area above the salt body, b represents a parameter and $V_{bss}$ represents the initial velocity in the subsalt sedimentary area.

7. The method of claim 6, wherein the velocity of the subsalt layer is a simple weighted average of the velocity of the top salt sedimentary area and the initial velocity of the subsalt sedimentary area.

8. The method of claim 6, wherein the parameter b is a constant value.

9. The method of claim 1, wherein the velocity of the subsalt layer is vertically constant along a base horizon of the salt body.

10. The method of claim 1, wherein the three dimensional smoothing filter is applied to the velocity of the subsalt layer without a base horizon of the salt body.

11. The method of claim 1, further comprising using the velocity of the subsalt layer in a prestack depth migration.

12. A method for building a subsalt velocity model, comprising:
    performing one or more migrations and one or more velocity updates on one or more prestack seismic gathers to determine a velocity of a sedimentary area surrounding a salt body, wherein the sedimentary area surrounding the salt body comprises a sedimentary area disposed above the salt body and a subsalt sedimentary area disposed below the salt body;
    determining an initial velocity of the subsalt sedimentary area by interpolating the velocity of the surrounding sedimentary area with one or more boundaries defining the salt body; and
    updating, using a microprocessor, the initial velocity of the subsalt sedimentary area, wherein updating the initial velocity of the subsalt sedimentary area comprises determining a thickness of the subsalt layer disposed below the salt body.

13. The method of claim 12, wherein the boundaries of the salt body are defined by:
    selecting a top horizon of the salt body;
    performing a salt-flood migration on a subsurface velocity model containing the salt body, the sedimentary area and the subsalt sedimentary area;
    selecting a base horizon of the salt body; and
    defining the boundaries of the salt body based on the top horizon and the base horizon.

14. The method of claim 13, wherein the boundaries of the salt body are further defined by one or more overhang horizons on the top horizon or the base horizon.

15. The method of claim 13, wherein performing the salt-flood migration comprises:
    extending the top horizon to a maximum depth of the subsurface velocity model; and
    flooding the subsurface velocity model with the velocity inside the salt body.

16. The method of claim 12, further comprising using the updated velocity of the subsalt sedimentary area in a prestack depth migration.

17. The method of claim 12, wherein the subsurface velocity model comprises:
    one or more velocity values in the salt body;
    one or more velocity values in the sedimentary area disposed above the salt body; and
    one or more velocity values in the subsalt sedimentary area, wherein the one or more velocity values comprise one or more velocity values in a subsalt layer disposed directly below the salt body.

18. The subsurface velocity model of claim 12, wherein the sedimentary area disposed above the salt body or the subsalt sedimentary area or both comprises sand and shale.

19. The method of claim 12, wherein the migrations are performed until an image of the sedimentary area has a predetermined sharpness.

20. A computer-readable medium having stored thereon computer-executable instructions which, when executed by a computer, cause the computer to:
    perform one or more migrations and one or more velocity updates on one or more prestack seismic gathers to determine a velocity of a sedimentary area surrounding a salt body, wherein the sedimentary area surrounding the salt body comprises a sedimentary area disposed above the salt body and a subsalt sedimentary area disposed below the salt body;
    select a top horizon of the salt body;
    perform a salt-flood migration on a subsurface velocity model containing the salt body, the sedimentary area and the subsalt sedimentary area;
    select a base horizon of the salt body;
    determine an initial velocity of the subsalt sedimentary area by interpolating the velocity of the surrounding sedimentary area with one or more boundaries defining the salt body; and
    update the initial velocity of the subsalt sedimentary area, wherein updating the initial velocity of the subsalt sedimentary area comprises determining a thickness of the subsalt layer disposed below the salt body.

* * * * *